(12) United States Patent
Cloutier et al.

(10) Patent No.: US 9,595,179 B2
(45) Date of Patent: Mar. 14, 2017

(54) SYSTEM AND METHOD FOR VIBRATION SEVERITY ASSESSMENT INDEPENDENTLY OF VIBRATION FREQUENCY

(71) Applicant: VIBROSYSTM INC., Longueuil (CA)

(72) Inventors: Mathieu Cloutier, Richelieu (CA); Marius Cloutier, Longueuil (CA); Louis-Pierre Lalonde, Varennes (CA)

(73) Assignee: VIBROSYSTM INC., Longueuil, Quebec ( * ) Notice: Subject to any disclaimer, the term of this patent is extended or adjusted under 35 U.S.C. 154(b) by 165 days.

(21) Appl. No.: 14/430,013

(22) PCT Filed: Sep. 26, 2012

(86) PCT No.: PCT/CA2012/050673
§ 371 (c)(1),
(2) Date: Mar. 20, 2015

(87) PCT Pub. No.: WO2014/047714
PCT Pub. Date: Apr. 3, 2014

(65) Prior Publication Data
US 2015/0248828 A1    Sep. 3, 2015

(51) Int. Cl.
*G01H 1/00*    (2006.01)
*G08B 21/18*    (2006.01)

(52) U.S. Cl.
CPC .............. *G08B 21/182* (2013.01); *G01H 1/00* (2013.01); *G01H 1/003* (2013.01)

(58) Field of Classification Search
CPC ......... G01H 1/003; G01H 1/00; G08B 21/182

(Continued)

(56) References Cited

U.S. PATENT DOCUMENTS 4,302,977 A * 12/1981 Sisson .................... G01H 1/003
                                                          73/658
4,408,285 A * 10/1983 Sisson ..................... G01H 1/00
                                                          702/56

(Continued)

OTHER PUBLICATIONS

"Azima DLI vibration Reference", Jan. 1, 2009, XP055274410, retrieved from the Internet—Section "Predictive Maintenance", "Summary of Amplitude Units", "Displacement, Velocity and Acceleration", "Commercial Standards (DLI Machinery Vibration Severity Chart)", "Vibration Measurement Parameters", United States.

(Continued)

*Primary Examiner* — J M Saint Surin
(74) *Attorney, Agent, or Firm* — Norton Rose Fulbright Canada LLP; Alexandre Daoust (57) ABSTRACT

The method includes receiving a real-time signal containing information pertaining to amplitude and frequency of vibrations of a machine component over a frequency spectrum including a first analysis bandwidth and a second analysis bandwidth, and using the real-time signal to determine values indicative of the severity of vibrations occurring at frequencies in the first analysis bandwidth in a first unit of one of displacement, velocity, and acceleration, and determine values indicative of the severity of vibrations occurring at frequencies in the second analysis bandwidth in a second unit of one of displacement, velocity and acceleration, the second unit being different from the first unit; and associating the determined values in a common unit representing comparable severity of vibrations in the first analysis bandwidth and the second analysis bandwidth.

8 Claims, 4 Drawing Sheets

(58) Field of Classification Search
USPC .......................................................... 73/579
See application file for complete search history.

(56) References Cited

U.S. PATENT DOCUMENTS

| | | | |
|---|---|---|---|
| 4,513,622 A * | 4/1985 | Uretsky | G01M 7/022 |
| | | | 73/664 |
| 4,935,748 A | 6/1990 | Schmidt et al. | |
| 5,864,718 A | 1/1999 | Stephenson, III et al. | |
| 5,875,420 A | 2/1999 | Piety et al. | |
| 5,895,857 A | 4/1999 | Robinson et al. | |
| 6,046,602 A | 4/2000 | Stein | |
| 6,257,066 B1 | 7/2001 | Chandler et al. | |
| 6,289,735 B1 | 9/2001 | Dister et al. | |
| 6,386,040 B1 | 5/2002 | Broillet et al. | |
| 6,789,030 B1 * | 9/2004 | Coyle | G01D 9/005 |
| | | | 702/182 |
| 6,810,741 B1 * | 11/2004 | Lafleur | G01M 7/00 |
| | | | 73/571 |
| 6,820,026 B1 | 11/2004 | Schoch | |
| 6,915,235 B2 | 7/2005 | Reeves et al. | |
| 2009/0070069 A1 | 3/2009 | Bouse et al. | |
| 2010/0102976 A1 | 4/2010 | Lee et al. | |

OTHER PUBLICATIONS

Arato Jr. et al., "Automatic Faults Diagnosis by Application of Neural Network System and Condition-Based Monitoring Using Vibration Signals", Journal of Communication and Computer, 7, No. 1, 16 pages in total, 2010.

* cited by examiner

SYSTEM AND METHOD FOR VIBRATION SEVERITY ASSESSMENT INDEPENDENTLY OF VIBRATION FREQUENCY

FIELD

The improvements generally relate to the field of vibration severity analysis of fixed, moving and rotary components of machines and more particularly, the described method and system automatically provides a uniform vibration severity assessment independently of the frequency of the vibrations.

BACKGROUND

Vibration analysis of machines is generally dependent upon the bandwidth within which the vibrations occur—this is reflected by "vibration severity charts" such as those from international standard organizations such as ISO. In a low frequency bandwidth (e.g. <10 Hz), a given vibration severity is associated with a constant amplitude of displacement across the low frequency bandwidth, i.e. by the maximum displacements of the component that are caused by such vibrations. In this manner, an operator detecting a displacement amplitude exceeding a given level at any frequency within the low frequency bandwidth can trigger an alarm or the like. However, in much higher bandwidths (say over 1,000 Hz), a given vibration severity is generally indicated by constant acceleration values across the bandwidth, rather than constant displacement values. Again, in intermediate bandwidths (say between 10 Hz and 1,000 Hz), a given vibration severity is indicated by constant velocity values across the bandwidth.

It can thus be understood that some machine components are submitted to vibrations in a bandwidth for which the analysis is characterized by displacement measurement (in the case of low frequency bandwidth), whereas others are associated with velocity measurement (for intermediate frequency bandwidths), and others still are associated with acceleration measurement (high frequency bandwidths). However, some components may require a vibration analysis which overlaps two or more adjacent bandwidths which makes it complicated, counter-intuitive, and time-consuming for operators to assess the severity of the vibrations in the different bandwidths, particularly in complex machinery having a plurality of components and vibration harmonics. Accordingly, there remains a need to simplify vibration severity analysis for machine operators.

SUMMARY

The system and method described herein can automatically attribute a uniform vibration severity indication, such as an alarm level, or a single value in a synthetic unit representative of vibration severity, independently of the bandwidth in which the severe vibration occurs.

For illustrative purposes such a synthetic unit will be defined herein as VSM (Vibration Severity Measurement) to quantify the dimensional vectors: (displacement, frequency) at low frequencies, (velocity, frequency) at medium frequencies, or (acceleration, frequency) at high frequencies into associated unified indications of vibration severity, e.g. 1.0 VSM being associated with a lesser vibration severity than 5.0 VSM, for instance. Such VSM values can be displayed as comfort or discomfort zones, via a transfer function which can be made part of an electronic circuit (controller) located between the accelerometer and an alarm module.

The method or system can convert a real-time output signal of a vibration sensor (e.g. an accelerometer) into the synthetic severity alarm number in both of two or more monitored frequency bandwidths, and thereby take protective action if needed, independently of the frequency of a severe vibration, and optionally provide a value in the single synthetic unit which is indicative of the severity of the vibration, allowing operators to work with unified severity units independently of the frequency range.

In accordance with another aspect, there is provided a method for providing a vibration severity indication of a machine component, the system comprising: receiving a real-time signal containing information pertaining to amplitude and frequency of vibrations of the component over a frequency spectrum including a first analysis bandwidth and a second analysis bandwidth, and using the real-time signal to determine values indicative of the severity of vibrations occurring at frequencies in the first analysis bandwidth in a first unit of one of displacement, velocity, and acceleration, and determine values indicative of the severity of vibrations occurring at frequencies in the second analysis bandwidth in a second unit of one of displacement, velocity and acceleration, the second unit being different from the first unit; associating the determined values for both the first analysis bandwidth and the second analysis bandwidth to values in a common unit representing comparable severity of vibrations in the first analysis bandwidth and the second analysis bandwidth; and generating a unique signal indicative of the determined values reaching a given value in the common unit independently of whether the given value is reached in the first bandwidth or the second bandwidth.

In accordance with another aspect, there is provided a system for providing a vibration severity indication of a machine component, the system comprising: a vibration sensor located on or adjacent to the component, providing a real-time signal containing information pertaining to amplitude and frequency of vibrations of the component over a spectrum including at least a first analysis bandwidth and a second analysis bandwidth during use, a controller connectable to receive the real-time signal from the vibration sensor, the controller having a function to determine values indicative of the severity of vibrations occurring at frequencies in the first analysis bandwidth in a first unit of one of displacement, velocity, and acceleration, and values indicative of the severity of vibrations occurring at frequencies in the second analysis bandwidth in a second unit of one of displacement, velocity and acceleration, the second unit being different from the first unit; a function to associate the values of both the first analysis bandwidth and the second analysis bandwidth to values in a common unit representing comparable severity of vibrations in the first analysis bandwidth and the second analysis bandwidth, and a function to generate a signal indicative of a given level of severity of vibrations being reached based on the association.

In accordance with another aspect, there is provided a vibration severity analysis method by which a real time output of an accelerometer is processed through an electronic circuitry or the like that contains: a function that translates the real time output at given frequency into either one of at least two of: a) constant displacement value at low frequencies, b) constant velocity value at medium frequencies, c) constant acceleration value at high frequencies; a function that compares said translated value to one predetermined synthetic alarm level number that represents a protection level independently of the frequency.

In accordance with another aspect, there is provided a vibration severity analysis system comprising: a processor for receiving an acceleration signal from at least one accelerometer, said acceleration signal being indicative of vibrations, further having at least two of the following functions: for vibrations established in a low frequency range, converting the acceleration measurement output into a maximum displacement indication, for vibrations in a medium frequency range, converting the acceleration measurement output into a maximum velocity indication, for vibrations in a high frequency range, converting the acceleration measurement output into a maximum acceleration indication, and further having a function of attributing a severity alarm level to the converted acceleration measurement, the severity alarm level being representative of vibration severity independently of the effected conversion.

In accordance with another aspect, there is provided a method of analyzing severity using a real time output of an accelerometer, the method comprising: 1) translating the real time output into at least two of: a) displacement values at low frequencies, b) velocity values at intermediate frequencies, and c) acceleration values at high frequencies; 2) determining an overall vibration severity level independently of frequency of occurrence of vibrations, by comparing said translated values to a corresponding at least two of: a) a constant displacement value across the low frequency bandwidth associated with the overall severity level, b) a constant velocity value across the intermediate frequency bandwidth associated with the overall severity level, and c) a constant acceleration value across the high frequency bandwidth associated with the overall severity level.

In accordance with another aspect, there is provided a method of activating a protective measure upon component vibrations reaching an associated vibration severity level, the method comprising: obtaining a vibration signal of said vibrations at frequencies spanning one of at least a low frequency bandwidth and an adjacent intermediate frequency bandwidth and at least an intermediate frequency bandwidth and an adjacent high frequency bandwidth, effecting a bandwidth-dependent transfer function on said vibration signal producing an output in which, independently of original units of the vibration signal, the corresponding at least two of vibrations spanning the low frequency bandwidth are represented in units of displacement amplitude, vibrations spanning the intermediate frequency bandwidth are represented in units of velocity amplitude, and vibrations spanning the high frequency bandwidth are represented in units of acceleration amplitude; comparing the corresponding at least two of displacement amplitude unit representation across the low frequency bandwidth to a constant displacement amplitude value across the low frequency bandwidth; velocity amplitude unit representation across the intermediate frequency bandwidth to a constant velocity amplitude value across the intermediate frequency bandwidth; and acceleration amplitude unit representation across the high frequency bandwidth to a constant acceleration amplitude value across the high frequency bandwidth; wherein said corresponding at least two of constant displacement amplitude value, constant velocity amplitude value, and constant acceleration amplitude value are associated to the same vibration severity level independently of the bandwidth; and activating the protective measure upon determining from said comparison that said vibrations at least reach said vibration severity level at any frequency within said corresponding bandwidths.

In accordance with another aspect, there is provided a system for activating a protective measure upon determining that vibrations of a component reach an associated vibration severity level, the system comprising: at least one vibration sensor generating a vibration signal indicative of an amplitude of said vibrations when submitted thereto, the vibration signal spanning one of at least a low frequency bandwidth and an adjacent intermediate frequency bandwidth and at least an intermediate frequency bandwidth and an adjacent high frequency bandwidth, a bandwidth-dependent transfer function receiving the vibration signal, and outputting a converted signal in which, independently of original amplitude units of the vibration signal, the corresponding at least two of vibrations spanning the low frequency bandwidth are represented in units of displacement amplitude, vibrations spanning the intermediate frequency bandwidth are represented in units of velocity amplitude, and vibrations spanning the high frequency bandwidth are represented in units of acceleration amplitude; a comparator function comparing the corresponding at least two of displacement amplitude unit representation across the low frequency bandwidth to a constant displacement amplitude value across the low frequency bandwidth; velocity amplitude unit representation across the intermediate frequency bandwidth to a constant velocity amplitude value across the intermediate frequency bandwidth; and acceleration amplitude unit representation across the high frequency bandwidth to a constant acceleration amplitude value across the high frequency bandwidth; wherein said corresponding at least two of constant displacement amplitude value, constant velocity amplitude value, and constant acceleration amplitude value are associated to the same vibration severity level independently of the bandwidth; and a protection module activating the protective measure upon determining, based on said comparison, that said vibrations at least reach said vibration severity level at any frequency within said corresponding bandwidths.

Many further features and combinations thereof concerning the present improvements will appear to those skilled in the art following a reading of the instant disclosure.

DESCRIPTION OF THE FIGURES

In the figures,

FIG. 3 is a chart showing different signal treatment bandwidths for the system of FIG. 2.

DETAILED DESCRIPTION

Figure 1:
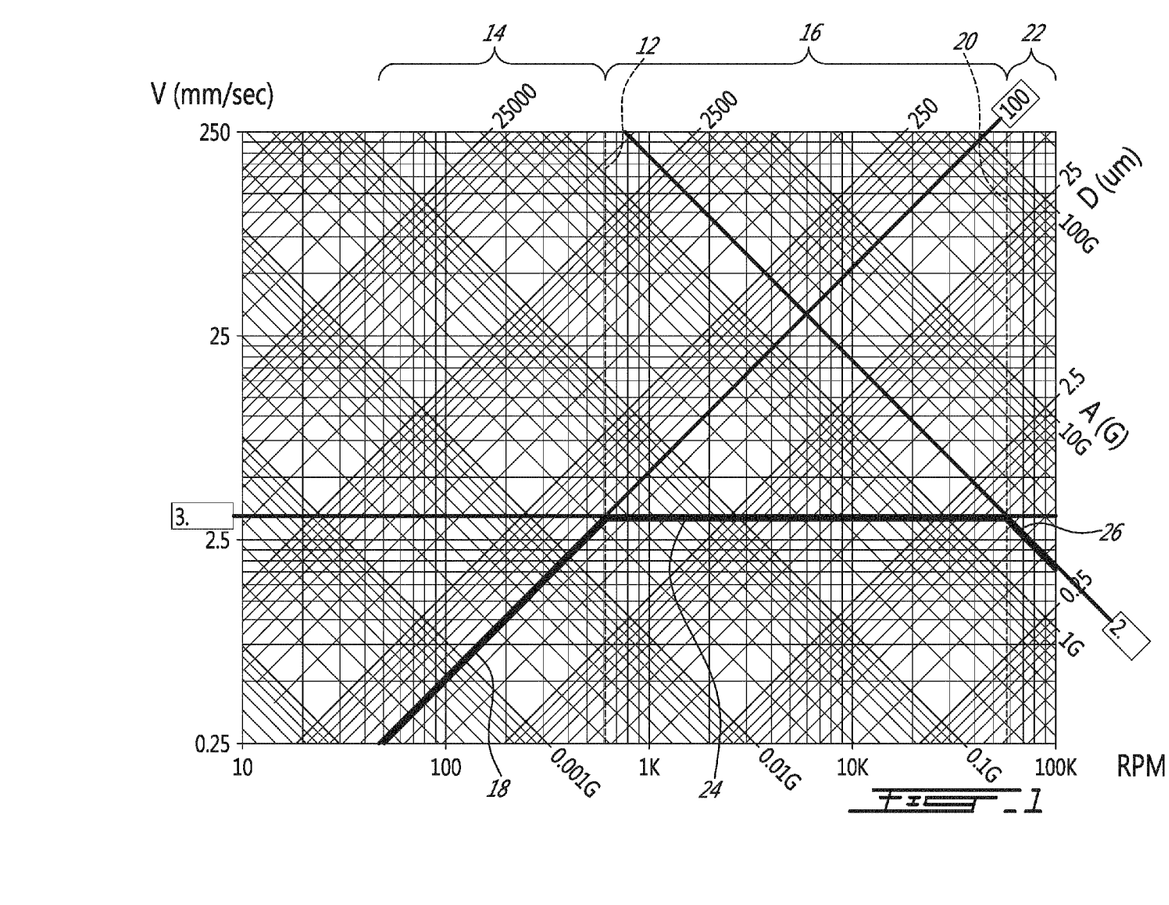
FIG. 1 is a chart showing different vibration severity thresholds in different frequency ranges.

FIG. 1 shows a graph illustrating values of displacement, velocity, and acceleration of a rotary component, plotted against RPM values which are representative of frequency in the relation 60 RPM=1 Hz ($sec^{-1}$).

An inferior frequency limit 12 is set, delimiting a low frequency bandwidth 14 from an intermediate frequency bandwidth 16. The low frequency bandwidth 14 is characterized by the fact that a given vibration severity is best indicated in this bandwidth using a constant value in units of displacement (e.g. micrometers—µm). Henceforth, a given alarm level associated to a given severity of vibrations in this bandwidth can be set by a constant displacement curve 18.

In this example, a superior frequency limit 20 is also set, delimiting the intermediate frequency bandwidth 16 from a high frequency bandwidth 22. The intermediate frequency bandwidth 16 is characterized by the fact that vibration severity is best indicated in this bandwidth using values in units of velocity (e.g. mm/sec), and an alarm level corresponding in severity to the constant displacement curve 18 plotted in the low frequency bandwidth 14 can be set here as a constant velocity curve 24. The high frequency bandwidth 22 is characterized by the fact that vibration severity is best indicated in this bandwidth using values in units of acceleration (e.g. gravitational acceleration G where 1 G=9.8 m/sec$^2$). In these high frequencies, an alarm level corresponding in severity to the alarm levels set in the intermediate frequency and low frequency bandwidths (16, 14) can be set here as a constant acceleration curve 26.

It will also be understood that machines having rotary components will only rarely have vibrations spanning three different bandwidths, many of interest being satisfactorily analyzed using only two different bandwidths. In the light of this information, it will be understood that even the fact of having two frequency limits 12, 20 is optional, a single frequency limit delimiting two bandwidths being a satisfactory basis for many alternate embodiments of interest. This being stated, the evolved exemplary embodiment will now be described having three bandwidths 14, 16, 22, where the inferior frequency limit 12 is illustratively set at 10 Hz (600 RPM), and the superior frequency limit 20 at 1 KHz (60 000 RPM).

In this exemplary embodiment, a first vibration severity alarm level was set at a displacement of 100 μm in the low frequency bandwidth, vibrations having a peak-to-peak displacement below that threshold value in the low frequency bandwidth being considered unalarming, or attributed a "Very Good" status for instance. A comparable severity alarm level in the intermediate frequency bandwidth can be set at 3 mm/sec, for instance. Below, two examples of how common units can be achieved to unify these two different analysis methods are detailed.

A first example is to associate velocity values to values of displacement, e.g. a 3 mm/sec value in the intermediate bandwidth can be "translated" into its equivalent in the low frequency bandwidth—i.e. 100 μm—and the equivalent displacement value which can be considered more intuitive to grasp by a user can be provided to the user, rather than displaying a velocity value for instance. A displacement value is thus used as a common reference unit. In this manner, acceleration values of comparable severity in the high frequency range, e.g. 2 G, can also be translated into the equivalent displacement value of 100 μm. This technique can also be used in embodiments where the value is not displayed numerically to the operator/user, but rather used to trigger an alarm of a corresponding severity level which is interfaced to the user in any suitable manner—e.g. the user sets an alarm at a vibration severity level of 100 μm of displacement, and the alarm is triggered independently of whether the value of 100 μm is reached in the low frequency bandwidth, a value of 3 mm/sec is reached in the intermediate frequency bandwidth, or a value of 2 G acceleration is reached in the high frequency bandwidth. Further, as will be detailed below, more than one threshold level can be set to trigger actions or alarms associated to increasing severity.

A second example can be to associate velocity, displacement, or acceleration units to a new reference unit which will be referred to herein as a synthetic unit indicative of vibration severity independently of the bandwidth or original units. The numeral 1 of such a synthetic unit can correspond to the afore-mentioned upper limit of a comfort zone, in one example. This approach is detailed below where the synthetic unit is referred to as the unit of VSM (Vibration Severity Measurement) and a value of 1 VSM is associated to the upper limit of a comfort zone within which vibrations are considered minimal or non stressful for the machine.

Henceforth, in the following example, we will consider that a value of 1 VSM corresponds to a constant displacement of 100 microns (μm—peak to peak) between 1 and 10 Hz, a constant peak velocity of 3,1416 mm per second between 10 and 1,000 Hz, and a constant peak acceleration of 2,012 G (19.73 m/s$^2$) over the upper frequency limit of 1,000 Hz.

The operators of such machine may then want, for instance, to set a first "mild" alarm at the vibration severity values associated to 5 VSM, and a "strong" alarm at vibration severity values associated to 10 VSM, whatever the frequencies of the vibrations. Corresponding alarms can be associated to corresponding protective actions, as will be detailed below.

Figure 2:
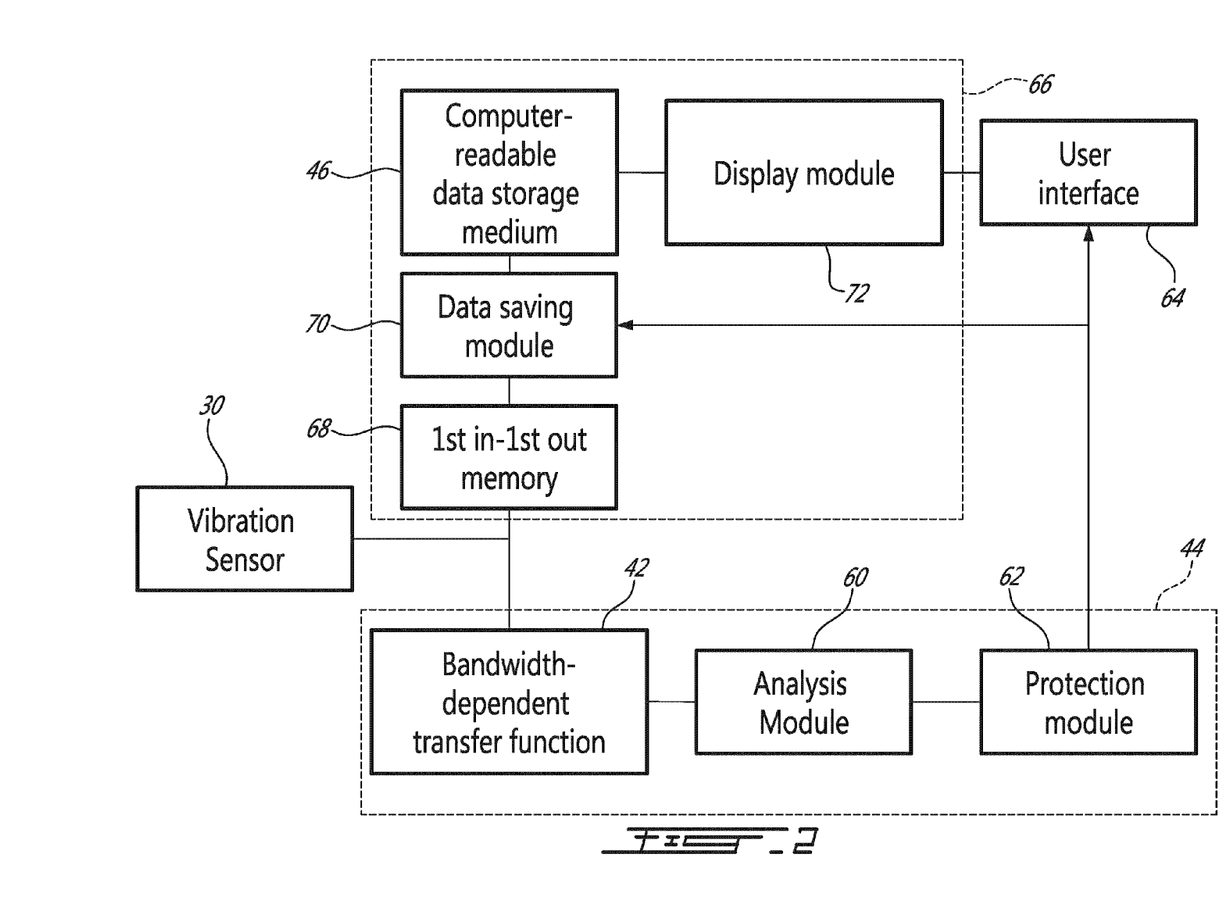
FIG. 2 is a bloc diagram showing an example of a system for uniform vibration severity analysis.

An example of a system is illustrated in FIG. 2. The system uses a real-time signal provided by a vibration sensor 30. In the illustrated example, the vibration sensor 30 is an accelerometer and the real-time signal is in the form of values in units of acceleration amplitude which fluctuate as a function of time. The accelerometer may be mounted on a fixed component adjacent to a rotary component, for instance. In alternate embodiments, the vibration sensor 30 can be a displacement sensor outputting a real-time signal in the form of values in units of displacement amplitude which fluctuate as a function of time, a velocity sensor, or a combination of sensor units, to name a few examples.

The signal from the vibration sensor is processed in a bandwidth-dependent transfer function 42 which can be embodied by a simple electronic circuit. The bandwidth-dependent transfer function 42 processes the real-time signal differently depending on the frequency bandwidth. More particularly, it converts, or translates, the amplitude units of in at least one of at least two different bandwidths into units with which vibration severity analysis can be carried out for that bandwidth. For instance, referring to FIG. 3, in the case of a an accelerometer signal spanning a low frequency bandwidth 14 and an intermediate frequency bandwidth 16, the acceleration amplitude values will be doubly integrated in the low frequency bandwidth 14 to yield frequency dependent displacement amplitude values for that bandwidth, whereas the acceleration amplitude values will be simply integrated in the intermediate frequency bandwidth 16 to yield frequency dependent velocity amplitude values for the intermediate frequency bandwidth 16. If signals in the high frequency bandwidth 22 are to also be taken into account, the acceleration amplitude values in that bandwidth 22 can be left unaltered by the transfer function.

Typically values at frequencies being out of range from the bandwidths under analysis can be eliminated by way of filters or the like. For instance, as shown in FIG. 3, frequencies in bandwidths 34 and 36, below and above the bandwidths of interest 14, 16, 22 are considered filtered zones treated by a corresponding one of a low-pass filter and a high-pass filter, and are separated from the bandwidths of interest 14, 16, 22 by corresponding transition zones 38, 40.

Alternately, in the case where the vibration sensor detects displacement rather than acceleration, for instance, a simple differentiating function can be set for the intermediate frequency bandwidth, and a double differentiating function can be set for the high frequency bandwidth.

At least one vibration severity level is associated to corresponding, constant, maximum amplitude values in each of the bandwidths, independently of the units used in the individual bandwidths, as detailed above.

In a next step, the signal is processed through an analysis module 60, or function.

According to one embodiment, the analysis module 60 can determine a maximum amplitude value in each bandwidth, and in parallel, compare the maximum amplitude values in each of the bandwidths to the constant amplitude value in the unit of the bandwidth which was previously associated to the given vibration severity level. A single alarm signal, associated to the given vibration severity level, is generated when in this manner, the maximum amplitude values are determined to have reached or exceeded a given vibration severity level, independently of the bandwidth where the given vibration severity has occurred, and of the units used in that bandwidth.

According to another embodiment, rather than outputting an alarm indication upon the vibration severity reaching a given threshold as detailed above, corresponding constant maximum amplitude values in each of the bandwidths can be associated to corresponding vibration severity values in the synthetic unit by multiplication by a predetermined bandwidth-dependent constant, the vibration severity values of the at least two bandwidths can be compared to one another, and the analysis module can output a single vibration severity level value, in the synthetic unit, corresponding to the maximum vibration severity value detected across the two or more bandwidths. In such an embodiment, the single vibration severity level value output can be directly made accessible to an operator, for instance, to allow the operator to obtain a quick grasp of overall vibration severity by consulting a single value, and without having to independently analyze vibrations in different frequency bandwidths using different analysis methods.

For example, referring to FIG. 2, the step of translating, or associating, detected vibrations in the unit (μm, mm/sec, G) corresponding to the associated frequency bandwidth can be undertaken by the transfer function 42 which can be referred to as an associator and made part of an electronic circuit 44 of the system. This function 42 can determine for each specific output from the accelerometer the VSM value to be attributed to such output.

(i) For frequencies in the low frequency bandwidth (e.g. <10 Hz), the acceleration output can be doubly integrated in time, for instance, to give a displacement value that can thereafter be translated into a VSM value. For instance, if that value is 75 microns, and if the chosen 1 VSM corresponds to a displacement of 100 microns, the VSM value of the output for a given frequency can be 0.75 (in the "Very Good" zone).

(ii) For frequencies in the intermediate frequency bandwidth (e.g. between 10 and 1,000 Hz), the acceleration output can be simply integrated in time, for instance, to give a velocity value that will be translated in a VSM value. For instance, if the chosen 1 VSM value corresponds to a velocity of 3.1416 mm/second, and if the computed velocity is under 2 mm/second, the VSM value of the measure will be less than 1.

(iii) For frequencies over 1,000 Hz, the acceleration output can be taken as such, without additional treatment. For instance, if the measured acceleration is less than 2 G, and if the chosen 1.0 VSM value is 2G, the VSM value will be less than 1.

Henceforth, the signal generated by the system following the association with the common units can take different forms and have different effects.

In the example embodiment shown in FIG. 2, a protection module 62 is also provided to trigger protective actions based on the overall previously obtained vibration severity indication. In accordance with one embodiment, the protection module 62 can be provided with more than one severity level threshold, and trigger protective actions associated with the severity level threshold detected. For instance, for overall vibration severity detected above a first value in the synthetic unit, an alarm signal can be indicated at a user interface 64, whereas when vibration severity is determined to reach a second, higher value in the synthetic unit, the protection module can automatically trigger a shut-down sequence for the machine, for instance.

The requirement of frequency analysis by the operator can thus be avoided, and the operator instead is being presented a simple alarm. Henceforth, a unitary electronic circuit can protect a machine in more than one frequency range, in real time. The choice of a protection level can be reduced to one VSM value, which is very simple and efficient for a machine operator.

Still referring to the example embodiment shown in FIG. 2, it will be understood that the illustrated embodiment includes an additional, and optional, data storage subsystem 66 for storing information concerning vibrations at given periods in time which can be later accessed by the operator via a display.

The data storage subsystem in this embodiment uses a $1^{st}$-in-$1^{st}$-out memory 68 which stores the vibration signal. In this embodiment, it was chosen to process the raw data from vibration sensor through this memory 68, prior to any signal treatment. A data saving module 70 is also provided to trigger the storage of the instantaneous contents of the $1^{st}$-in-$1^{st}$-out memory 68 into a computer-readable data storage medium 46. The data saving module 70 can be activated via the protection module 62, for instance, to save the contents of the $1^{st}$-in-$1^{st}$-out memory 68 upon occurrence of a given alarm level, for instance, or can be activated periodically to build trend or history data.

In the specific embodiment depicted in FIG. 2, the data stored in the computer-readable data storage medium 46 upon the detection of a given alarm level can be accessed by a user via the user interface 66. For example, in some applications, the operator will wish to access the detail of the vibrations to obtain more information about what triggered the alarm. In the case of operators who prefer reasoning in terms of displacement amplitude, the display module can include a transfer function which doubly integrates an accelerometer signal over all the bandwidths of interest, for instance, and proceed with a Fourier transform to display the data on a graph such as illustratively provided at FIG. 4. Curves representing one or more incrementing alarm levels across two or more different bandwidths can also be displayed on the graph for the user to be able to identify the frequency(ies) which caused the alarm(s) with a single glance.

Figure 4:
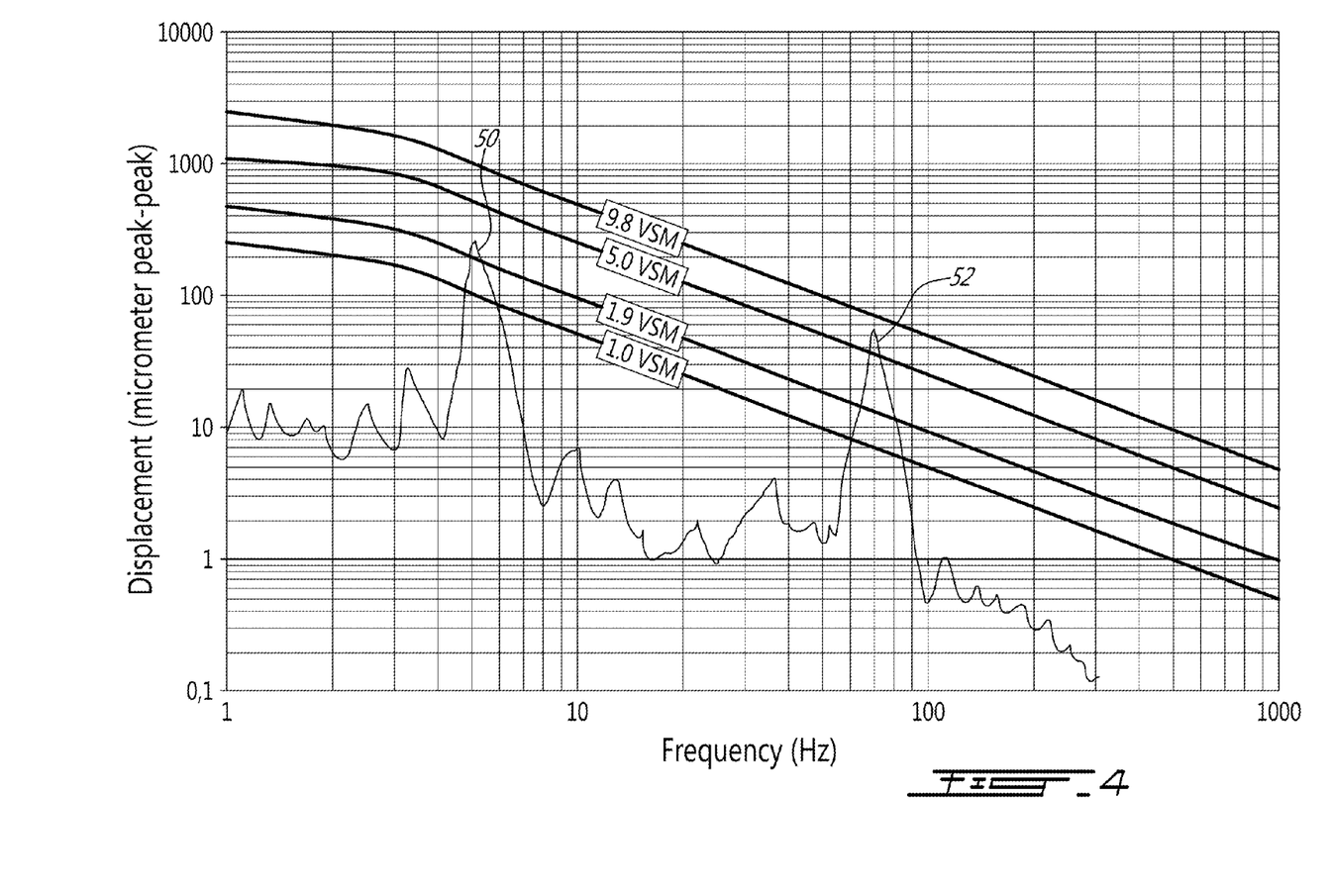
FIG. 4 is an exemplary graphical representation of vibrations at a given time period and four alarm thresholds.
Figure 7:
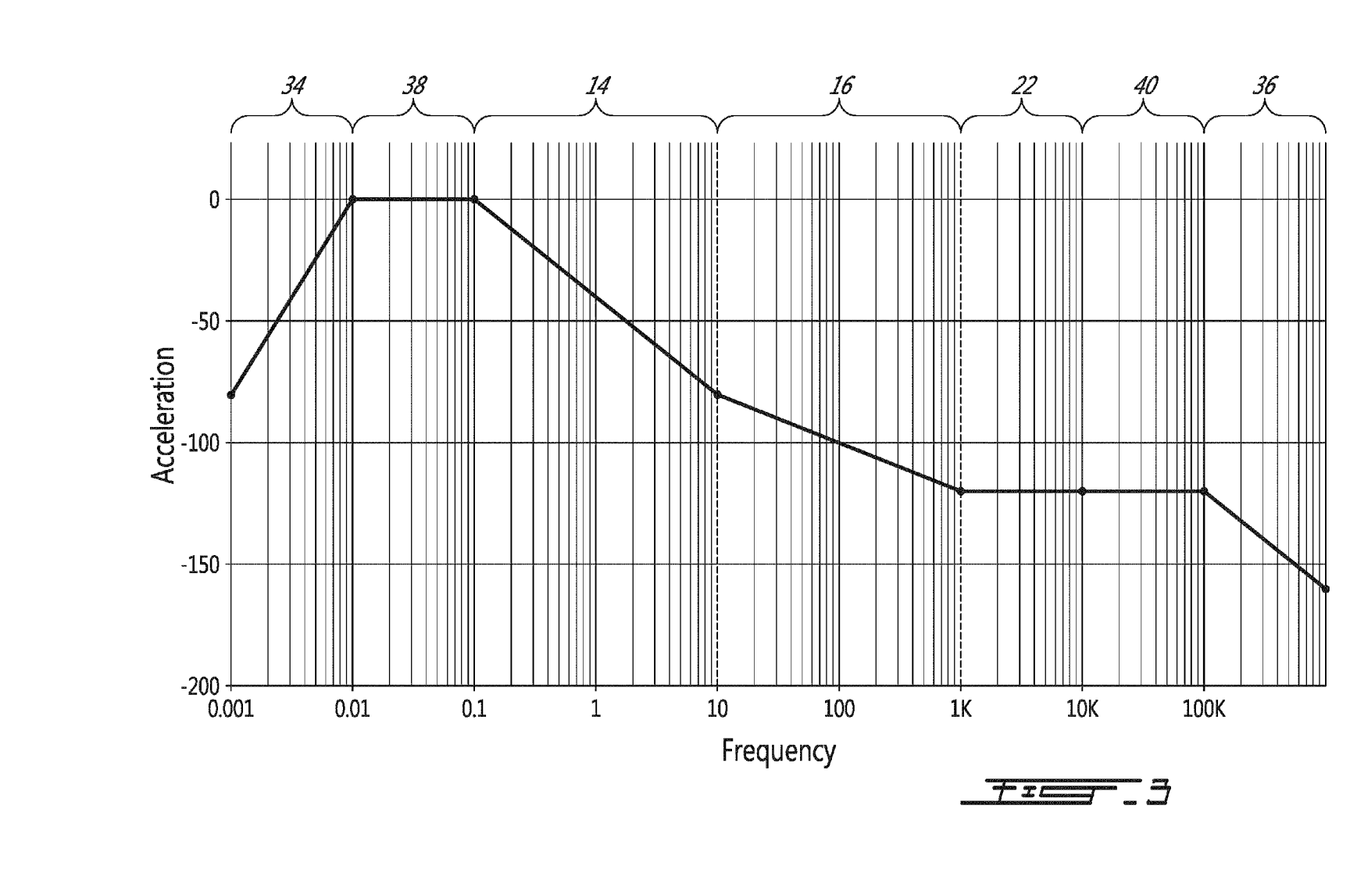

More particularly, the graph shown in FIG. 4 is associated to an example of a system adapted for a slow rotating hydro turbine-generator, the VSM values corresponding to 5 zones ranging from "Very Good" to "Very Rough" derived from an ISO displacement severity chart. Such a hydro turbine-generator may not require monitoring in the high frequency ranges, and so an example embodiment can include only a conversion function for a first bandwidth referred to as a low frequency bandwidth corresponding to <2.5 Hz (such as double integration for instance), and a conversion function for a second bandwidth referred to as an intermediate bandwidth corresponding to >2.5 Hz, (such as single integration for instance), instead of having three different bandwidths. In the graph shown, two peaks of vibration are observed, a first peak 50 around 5.5 Hz triggering the vibration severity threshold level of 1.9 VSM, in a "Fair Zone", and the second peak 52 around 70 Hz, triggering the vibration severity threshold level of 9.8 VSM, into a "Rough Zone".

For a turbogenerator machine using the same kind of ISO vibration severity chart, the VSM scale values of the transfer function can reflect a translation upward of the VSM curves by a certain factor, following the manufacturer's or operator's request for such machines. A turbo generator machine typically operating in higher frequency ranges, embodiments therefore can omit a translation function in the lower frequency ranges, for instance, having transfer functions only for a first bandwidth in the intermediate frequency range and a second bandwidth in the high(er) frequency range. In such a case, and if an accelerometer is used as the vibration sensor, the transfer function can simply leave the signal in the high frequency bandwidth unaffected.

In alternate embodiments, it will thus also be understood that acceleration data provided by an accelerometer can be substituted by velocity data provided by a velocimeter or by displacement data provided by a proximeter. In such case, the transfer function of the electronic circuitry will be adapted to reflect the nature of the primary input, i.e. velocity measurement or displacement measurement by appropriate differentiation or integration functions.

As can be seen therefore, the examples described above and illustrated are intended to be exemplary only. The scope is indicated by the appended claims.

What is claimed is:

1. A system for providing a vibration severity indication of a machine component, the system comprising:
    a vibration sensor positioned to sense the vibration of the machine component, providing a real-time signal containing information pertaining to amplitude and frequency of vibrations of the component over a spectrum including at least a first analysis bandwidth and a second analysis bandwidth during use, and
    an electronic circuit connectable to receive the real-time signal from the vibration sensor, the electronic circuit being configured to perform each one of
        a function to determine
            values indicative of the severity of vibrations occurring at frequencies in the first analysis bandwidth in a first unit of one of displacement, velocity, and acceleration, and
            values indicative of the severity of vibrations occurring at frequencies in the second analysis bandwidth in a second unit of one of displacement, velocity and acceleration, the second unit being different from the first unit;
        a function to associate the values of both the first analysis bandwidth and the second analysis bandwidth to values in a synthetic unit representing comparable severity of vibrations in the first analysis bandwidth and the second analysis bandwidth, and
        a function to generate a signal indicative of a given level of the severity of vibrations being reached based on the association.

2. The system of claim 1 wherein the vibration sensor is an accelerometer.

3. The system of claim 1 further comprising a memory for storing data concerning at least one vibration severity level of a comparable severity of vibrations occurring in both the first analysis bandwidth and the second analysis bandwidth, the function to associate being based on the stored data concerning the at least one vibration severity level.

4. A system for activating a protective measure upon determining that vibrations of a component of a machine reach an associated vibration severity level, the system comprising:
    at least one vibration sensor for generating a vibration signal indicative of an amplitude of said vibrations, the vibration signal spanning one of
        at least a low frequency bandwidth and an adjacent intermediate frequency bandwidth and
        at least the intermediate frequency bandwidth and an adjacent high frequency bandwidth,
    an electronic circuit for performing a bandwidth-dependent transfer function for receiving the vibration signal, and outputting a converted signal in which, independently of original amplitude units of the vibration signal, the corresponding at least two of
        vibrations spanning the low frequency bandwidth are represented in units of displacement amplitude,
        vibrations spanning the intermediate frequency bandwidth are represented in units of velocity amplitude, and
        vibrations spanning the high frequency bandwidth are represented in units of acceleration amplitude;
    an analysis module for performing a comparator function for comparing the corresponding at least two of
        displacement amplitude unit representation across the low frequency bandwidth to a constant displacement amplitude value across the low frequency bandwidth;
        velocity amplitude unit representation across the intermediate frequency bandwidth to a constant velocity amplitude value across the intermediate frequency bandwidth; and
        acceleration amplitude unit representation across the high frequency bandwidth to a constant acceleration amplitude value across the high frequency bandwidth;
        wherein said corresponding at least two of constant displacement amplitude value, constant velocity amplitude value, and constant acceleration amplitude value are associated to a synthetic unit indicative of the associated vibration severity level independent of the bandwidth; and
    a protection module for activating the protective measure upon determining based on said comparison that said vibrations at least reach said vibration severity level at any frequency within said corresponding bandwidths.

5. The system of claim 4 wherein the at least one vibration sensor is an accelerometer, and the original vibration amplitude units are units of acceleration.

6. The system of claim 4 wherein the vibration signal spans the low frequency bandwidth, the intermediate frequency bandwidth, and the high frequency bandwidth.

7. The system of claim 4 further comprising an indicator activatable by the protection module to display an indication of said vibration severity level.

8. The system of claim 7 wherein the indication is a numerical value in a synthetic unit, said numerical value corresponding to a maximum severity of vibrations reached independently of bandwidth of occurrence.

\* \* \* \* \*